(12) United States Patent
Hansen et al.

(10) Patent No.: US 12,423,932 B2
(45) Date of Patent: Sep. 23, 2025

(54) METHOD AND SYSTEM FOR EVALUATING A DENTAL PREPARATION SURFACE

(71) Applicant: 3SHAPE A/S, Copenhagen K (DK)

(72) Inventors: Thomas Lundgaard Hansen, Copenhagen K (DK); Karl-Josef Hollenbeck, Copenhagen Ø (DK)

(73) Assignee: 3SHAPE A/S, Copenhagen K (DK)

( * ) Notice: Subject to any disclaimer, the term of this patent is extended or adjusted under 35 U.S.C. 154(b) by 280 days.

(21) Appl. No.: 17/920,187

(22) PCT Filed: Apr. 22, 2021

(86) PCT No.: PCT/EP2021/060521
§ 371 (c)(1),
(2) Date: Oct. 20, 2022

(87) PCT Pub. No.: WO2021/214212
PCT Pub. Date: Oct. 28, 2021

(65) Prior Publication Data
US 2023/0162457 A1 May 25, 2023

(30) Foreign Application Priority Data

Apr. 22, 2020 (DK) .................................. 202070247
Sep. 8, 2020 (DK) .................................. 202070583

(51) Int. Cl.
*G06T 19/20* (2011.01)
*A61C 13/34* (2006.01)
*G06T 17/00* (2006.01)

(52) U.S. Cl.
CPC .............. *G06T 19/20* (2013.01); *A61C 13/34* (2013.01); *G06T 17/00* (2013.01);
(Continued)

(58) Field of Classification Search
CPC ... G06T 19/20; G06T 17/00; G06T 2219/004; G06T 2219/2004; G06T 2219/2021; A61C 13/34; A61C 13/0004; A61C 9/004
See application file for complete search history.

(56) References Cited

U.S. PATENT DOCUMENTS 7,862,336 B2 1/2011 Kopelman et al.
8,858,231 B2 10/2014 Kopelman et al.
(Continued)

FOREIGN PATENT DOCUMENTS

| EP | 3197389 B1 | 8/2017 |
|---|---|---|
| WO | 2013079437 A2 | 6/2013 |
| WO | 2018022752 A1 | 2/2018 |

OTHER PUBLICATIONS

International Search Report (PCT/ISA/210) and Written Opinion (PCT/ISA/237) mailed on Jul. 14, 2021, by the European Patent Office as the International Searching Authority for International Application No. PCT/EP2021/060521. (12 pages).
(Continued)

*Primary Examiner* — Chong Wu
(74) *Attorney, Agent, or Firm* — Buchanan Ingersoll & Rooney PC

(57) ABSTRACT

Disclosed is a method and system of evaluating a dental preparation surface, including obtaining a digital oral situation and/or a portion thereof including a preparation surface, evaluating an attainable thickness based on the preparation surface and surroundings and comparing the attainable thickness to minimum thickness.

15 Claims, 7 Drawing Sheets

(52) U.S. Cl.
    CPC ............ *G06T 2219/004* (2013.01); *G06T 2219/2004* (2013.01); *G06T 2219/2021* (2013.01)

(56) References Cited

U.S. PATENT DOCUMENTS

| | | |
|---|---|---|
| 2006/0063135 A1 | 3/2006 | Mehl |
| 2015/0056576 A1* | 2/2015 | Nikolskiy ............ A61C 9/004 433/214 |
| 2017/0273763 A1* | 9/2017 | Fisker ............ A61C 9/0046 |
| 2018/0132986 A1* | 5/2018 | Wolter ............ A61C 13/0835 |
| 2018/0368956 A1 | 12/2018 | Fisker |

OTHER PUBLICATIONS

Montero, Javier et al., "The effect of age and prosthodontic status on the clinical and electromyographic assessment of the interocclusal rest space", The Journal of Prosthetic Dentistry, May 2019, Abstract, pp. 791-796, vol. 121, Issue 5, ScienceDirect® Elsevier B.V. (3 pages).

* cited by examiner

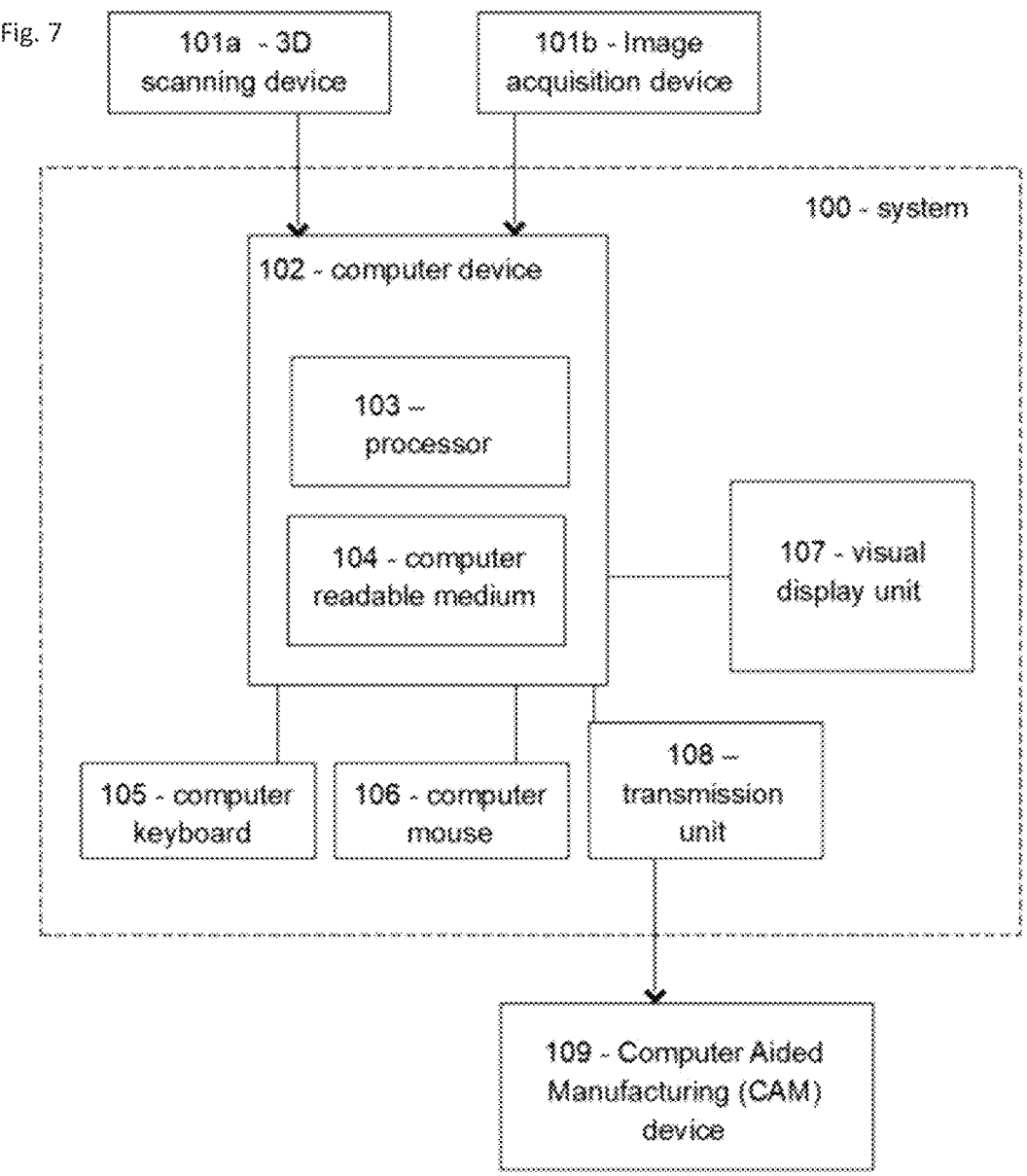

METHOD AND SYSTEM FOR EVALUATING A DENTAL PREPARATION SURFACE

FIELD

This disclosure generally relates to a system and method for evaluating a dental preparation surface; in particular, a method and system of preparing a dental preparation surface in a single appointment without requiring the design of a dental prosthesis.

BACKGROUND

Prosthodontics is the dental specialty concerned with the design, manufacture and fitting of artificial replacements (prostheses) for teeth. In preparing for a dental prosthesis, a dental practitioner may grind down existing dentition to create a base for mounting the dental prosthesis. This is known as the preparation surface. A 3D model of the preparation surface and surroundings may be obtained, and a fitting prosthesis may then be designed and manufactured and placed into the patient's mouth. Examples of dental protheses comprise: crowns, inlays, onlays, bridges, and others.

The prosthesis may be designed digitally based on a digital 3D representation of an oral situation of a patient. This digital 3D representation may be obtained, for example, by digitally scanning a physical impression, a cast model thereof, or by directly using an intraoral scanner. Manufacture may also be digital, for example, where a computer generates a milling path that may then be executed on a CNC milling machine. Dental prostheses may be milled from blocks or blanks of ceramic or glass-ceramic material.

At times, after a dental prosthesis has been manufactured, it may be found that it does not fit the preparation surface. One solution in this situation is to schedule another appointment with the patient and redo the preparation. Since this additional work is costly and time-consuming, it is often skipped. It may then be necessary to instead grind down the opposing tooth or the manufactured dental prosthesis, which is clearly a suboptimal solution. Further, to prevent this situation, a dental practitioner may err on the side of removing more material from the prosthesis site. This in turn, may result in the unnecessary removal of healthy tissue as well as weaken the prosthesis site.

SUMMARY

The disclosure comprises a computer-implemented method of evaluating a preparation surface comprising:

A method for analyzing dental preparation sites comprising: intraorally scanning at least parts of a dentition including a dental preparation surface intended for mounting of a prosthesis, creating a 3D digital model of said dentition, and analyzing said 3D digital model, where said analysis considers the attainable thickness of the prothesis if said prothesis were to be manufactured with a milling machine, and where the results of said analysis are presented before the prosthesis is manufactured.

The disclosure may also comprise:
obtaining a digital oral situation and/or a portion thereof, comprising the preparation surface;
evaluating at least one attainable thickness based on the preparation surface and surroundings; and
comparing the at least one attainable thickness to at least one minimum thickness.

As discussed above, a dental prosthesis that not fit a preparation surface is expensive in both time and money, and typically, dental practitioner have only a single session to prepare a preparation surface. Thus, dental practitioners often err on the side of removing too much tissue in preparing a preparation surface.

By taking into account limitations on not only the space available for the dental prosthesis, but on the method of manufacture, this situation may be prevented. Further, with the use of a digital dental prosthesis and/or a second intraoral scan, any additional changes to the prosthesis site may be made in a single visit to the dentist. This prevents the expense of an additional visit to the dentist, while reducing the likelihood of the unnecessary removal of material.

In a first aspect of the disclosure, a preparation surface is evaluated. First, a digital oral situation, which is a 3D digital model of an oral situation, and/or a portion thereof is obtained. This may be done, for example, by an intraoral scanner directly, or by a scan of a physical model of the oral situation. This 3D digital model may be based, for example, on voxels, meshes, and/or a combination of the above. A 3D digital model will typically have location values in three-dimensional space, allowing it to be placed in relation to other 3D digital models. The digital oral situation comprises at least one preparation surface, a portion of the oral situation that has been or is intended to be prepared for a dental prosthesis. It may also comprises at least one prosthesis site, which encompasses the preparation surface together with the surrounding dentition and soft tissue.

A 3D digital model may be represented by different formats, for example, by voxels, by point clouds, by meshes. Voxel representations use a three-dimensional grid to represent a 3D object. Each voxel may be a cube in a 3D space. If the object exists in that voxel, it is marked as present, and if not, it is absent. Point clouds are a collection of points in 3D space, each with an x, y, z coordinate. A mesh is a collection of vertices, edges, and faces. Vertices are individual points representing the surface, edges are lines connecting the vertices, and faces are continuous areas surrounded by vertices and edges. These may all be used to represent the digital dental models.

In some embodiments, the preparation surface is detected. In one embodiment, a dentist may manually annotate the preparation surface, for example, by examining the 3D digital model of the oral situation with 3D modeling software and outlining the preparation surface with relevant markers, such as is possible in 3Shape's dental desktop software. In one embodiment, the preparation surface may be detected, for example, by segmenting the oral situation to identify teeth and then identifying which teeth are the right shape for a preparation surface, for example, through heuristics such as size and proportion, or more sophisticated algorithms such as neural networks.

Next, at least one attainable thickness is calculated between the preparation surface of the surroundings, i.e. parts of the digital oral situation that are not part of the preparation surface. An attainable thickness is the shortest distance between the preparation surface and the surroundings, and may take into account further limitations, as discussed below. Attainable thickness may be calculated by finding a point on the prosthesis surface, finding a point on the surrounding oral situation, and calculating the distance between the two. This may be the closest point on the non-preparation surface parts of the oral situation. An attainable thickness may be adjusted by particular distances as the situation warrants.

In some embodiments of the disclosure, an evaluation of attainable thickness may take into account space requirements resulting from drill compensation of the prothesis inner surface, and/or desired distance from the prosthesis to the opposing and/or neighboring dentition. A non-zero desired distance between a dental prosthesis and opposing dentition can be motivated by the need to leave room for glaze, i.e. a coating on the prosthesis. Another motivation for a non-zero distance to the opposing dentition can be to allow for natural tooth growth and movement. It may be affected, for example, by: cement gaps, milling limitations such as drill radii, external coatings on the dental prosthesis. These are discussed in further detail below.

One thing to consider in looking at attainable thickness is the margin line, where the preparation surface meets the non-preparation surface. In calculating attainable thickness, points within a distance corresponding to the minimum thickness along the margin line should not be considered.

A minimum thickness is a minimum distance between the preparation surface and the non-preparation surface required for technical reasons such as the strength of the material. The minimum thickness may also be affected by which part of the dental prosthesis is being evaluated and what the dental prosthesis is to be used for. For example, the occlusal surfaces of a dental prosthesis generally need larger minimum thicknesses to account for the forces generated by biting, as compared to the walls along the lingual or buccal sides. A crown generally requires larger minimum thicknesses than a veneer.

The at least one attainable thickness is compared to the at least one minimum thickness. The minimum thickness may conflict with the attainable thickness, in that the minimum thickness may require more space that the attainable thickness allows. In such a case, it may be necessary to adjust the digital dental prosthesis, the preparation surface, and/or the surrounding dentition, as discussed below.

An evaluation according to this disclosure may be performed on a computer. Said computer may also be able to provide the visualization of the evaluation. The computer may also perform calculations related to establishing the digital 3D representation based on data from the intraoral scanner. The same display device may present data relevant during scanning and from a subsequent evaluation. The scanner may be connected to the computer with a cable, or wireless data transmission between scanner and computer may be provided for.

An embodiment further comprises generating an inner surface for a digital dental prosthesis based on the preparation surface.

A digital dental prosthesis is a 3D digital model of a dental prosthesis. An inner surface for the digital dental prosthesis may then be generated based on the preparation surface. For example, an initial inner surface may be generated by copying the shape of the prosthesis site. The inner surface may then for adjusted, for example, to accommodate for manufacturing limitations, material limitations, cement gaps, etc. These adjustments are described in further detail below.

An embodiment further comprises generating an outer surface for the digital dental prosthesis.

An outer surface for a digital dental prosthesis may be generated. This may be, for example, a 3D mesh selected from a library or generated by a computer-implemented method such as a neural network trained on tooth outer surfaces. The outer surface may be further adjusted, as discussed below.

An embodiment further comprises:
defining a negative space around the preparation surface based on the digital oral situation; and
generating an outer surface for the digital dental prosthesis based on the negative space.

A negative space around the preparation site is defined, that is, the empty space in which a dental prosthesis might fit. This may be done, for example, by examining the oral situation for neighboring teeth and/or gingiva, opposing teeth and/or gingiva, and other items in the oral situation that may limit a dental prosthesis. An outer limit of the negative space may be defined to encompass the areas of the oral situation relevant to creating the dental prosthesis, for example, a portion of the oral situation within a 3 cm radius of the center of the prosthesis site.

Based on this negative space, an outer surface for a digital dental prosthesis may be generated. If the outer surface meets the constraints of the negative space, e.g., does not overlap with neighboring teeth or opposing teeth, it may be used as the outer surface of the digital dental model.

The outer surface may also be altered to meet the constraints of the negative space. For example, it may be made taller or shorter, wider or narrower, or changed by some other parameters to make it bulge more or less on a particular side. This may be done manually by the dental practitioner, or as part of a computer-implemented method.

An embodiment further comprises generating the digital dental prosthesis based on the inner surface and the outer surface.

The digital dental prosthesis may be generated based on the inner surface and the outer surface. In an embodiment, both the inner surface and the outer surface are 3D meshes, and are connected at their closest intersecting points. Both the outer surface and the inner surface are positioned in the digital oral situation; The inner surface may be located relative to the preparation surface and the outer surface may be located based on the inner surface, attainable thickness/ and or negative space. The inner surface and outer surface may then be connected where they intersect, for example, for each point on a mesh model of the initial outer surface, finding the nearest point on the initial inner surface. If these points are lined up as a line, anything outside that line can be discarded, both on the initial inner surface and the initial outer surface, the model can be stitched together at these points to generate a digital dental prosthesis.

The practicalities around manufacturing impose several constraints on the digital dental prosthesis. In generating the digital dental prosthesis, it may be useful to take into account minimum thicknesses and attainable thicknesses.

The digital dental prosthesis may undergo further alterations, e.g. decimation and/or other forms of smoothing to make it easier to process or manufacture. For some forms of processing, for example, it may be faster to process where there are fewer points on the mesh. Hence, removing points on the mesh that are very close to each other through decimation may allow for more efficient processing. Smoothing may be used as well. If, for example, the line where the inner and our surfaces are stitched together is jagged, smoothing the line by removing points that are outliers may allow for easier manufacturing and a better fit. The digital dental prosthesis may be adjusted by preprogrammed changes or manually changed by the dental practitioner through e.g. a sculpting application.

An embodiment further comprises deriving the digital oral situation from an intraoral scanning device.

The digital oral situation may be derived from an intraoral scanning device. Examples of intraoral scanners that may be used to obtain a digital 3D representation are 3Shape Trios, Dentsply Sirona PrimeScan, and others. Using an intraoral scanning device is that subsequent scans allows subsequent scanning to be done, enabling further changes to the digital dental prosthesis and/or the oral situation, as described below.

An embodiment further comprises adjusting the digital dental prosthesis and/or the preparation surface by:
  evaluating the digital dental prosthesis and/or preparation surface for the at least one minimum thickness and the at least one attainable thickness;
  comparing the at least one minimum thickness and the at least one attainable thickness; and
  adjusting the digital dental prosthesis and/or preparation surface where the at least one minimum thickness and the at least one attainable thickness are in conflict.

An embodiment further comprises iteratively adjusting the digital dental prosthesis and/or preparation surface and evaluating them for the at least one minimum thickness and the at least one attainable thickness. This may help reduce the amount of healthy tissue removed. Typically, in creating a preparation surface, a dental practitioner gets only one session to prepare the preparation site, and the prosthesis is designed afterwards. Thus, a dental practitioner often errs on the side of removing too much material, since it is expensive to book another appointment and/or create a prosthesis that does not fit. Further, the dental practitioner often relies on their own visual judgment in creating a preparation sight. Removing more tissue that needed helps ensure that the prosthesis may be mounted, but may remove healthy tissue and/or weaken the prosthesis site. Further, in cases where the prosthesis site may not have enough tissue to support a crown, costly procedures such as core buildups may be required.

Using the method in this disclosure, a dentist may reduce the unnecessary removal of dental tissue, by removing a conservative amount of tissue and then using the digital oral situation to make a more accurate assessment of possible dental prostheses, rather than merely guessing. Further, the digital oral situation allows for attainable thicknesses to be assessed by the software, better informing the dental practitioner's choice. For example, the dentist may determine that certain materials are unsuitable for use.

The digital dental prosthesis may be evaluated for attainable thicknesses and minimum thicknesses, and adjusted accordingly, or rejected. Where there the digital dental prosthesis is not feasible, or undesirable for other reasons, the dental practitioner may adjust the oral situation, including the preparation surface. For example, where a minimum thickness is not met between a preparation surface and its neighbor, the dental practitioner may choose to further reduce the preparation surface, or grind down the neighboring tooth, depending on the situation. As discussed below, this adjustment may be further assisted by display of the areas where the oral situation conflicts with an otherwise good digital dental preparation.

Further, given the speed of an intraoral scanner, this may all be done in one patient session, rather than requiring the patient to return for a subsequent visit. This reduces costs and time for both dentist and patient.

An embodiment further comprises displaying the digital preparation surface, the digital oral situation, and/or digital dental prosthesis.

An embodiment further comprises:
  evaluating the preparation surface for problems areas based on the at least one attainable thickness;
  displaying the digital preparation surface, the digital oral situation, and/or the digital dental prosthesis; and
  highlighting the problem areas on the digital preparation surface the digital oral situation, and/or the digital dental prosthesis.

For some points on the preparation surface, the attainable thickness may not meet the requirements of the minimum thickness; these are problem areas. A preparation surface may be represented by a digital 3D model, i.e. a digital preparation surface. By evaluating the digital preparation surface for problem areas, a computer-implemented method may assist a dental technician in adjusting the digital preparation surface.

In such cases, the digital preparation surface, the digital oral situation, and/or the digital dental prosthesis may be displayed, for example, on a computer screen, with the problem areas highlighted. Highlighting here means drawing special attention to an area. This may be done, for example, by showing the problem area in a different color, with a contour around it, in a different texture, and/or of a different transparency. This may allow the dental practitioner to further correct the preparation surface, the surroundings, and/or the digital dental prosthesis, as discussed below.

In an embodiment, the preparation surface may be unchanged, and instead, problem areas on the surroundings may be highlighted. Problem areas may be shown on both the preparation surface and the surroundings, allowing the dental practitioner to make a decision on which to adjust.

An embodiment further comprises:
  aligning the digital dental prosthesis with the digital oral situation and/or the digital preparation surface; and
  displaying the digital dental prosthesis and the digital oral situation.

An embodiment further comprises aligning and displaying the digital dental prosthesis with the digital oral situation and/or the digital preparation surface, allowing the dental practitioner to make more informed choices regarding making the dental prosthesis. Here, both the digital dental prosthesis and the 3D digital model of the oral situation have Euclidean values denoting their location in 3D space. Given that the initial inner surface of the digital dental prosthesis is based on the prosthesis site, the digital dental prosthesis may be aligning the inner surface compared to the initial inner surface, allowing for the adjustments made. As the outer surface is generated in relation to the negative space in the digital oral situation, it may be aligned based on that.

Once the digital dental prosthesis is aligned, it may be displayed, for example, on a computer screen. This allows the dental practitioner to visually assess the potential dental prosthesis, and make adjustments accordingly. This may be further assisted by highlighting problem areas, as discussed below. The display may be particularly useful as part of an iterative process, as described above.

An embodiment further comprises:
  evaluating the aligned digital dental prosthesis and the digital oral situation for problem areas;
  displaying the aligned digital dental prosthesis and the digital oral situation; and highlighting the problem areas on the display.

An embodiment further comprises evaluating the aligned digital dental prosthesis and digital oral situation for problem areas and highlighting these problem areas on the display. Potential problem areas comprise: overlap, e.g. where the digital dental prosthesis and an object in the oral situation occupy the same space, areas where there is a risk of overlap, areas that cannot be manufactured due to milling limitations, and/or areas where the digital dental prosthesis fails to meet minimum thickness.

These problems may be shown on renderings of the digital 3D representation, color maps, or other. They may be shown on a screen or in a virtual reality environment. The presentation may highlight problem areas on the digital oral situation and/or the digital dental prosthesis that are problematic in the sense that minimum material thickness and/or any additional desired space cannot be attained. Visualization may help differentiate said areas. Visualization may use, e.g., different colors to show the severity of problems, for example the degree of violations of minimum thickness.

In some embodiments, problem areas may be shown as parts of the inner surface of a proposed design of a prosthesis, where the design may be based on drill direction, cement space specifications, and drill radius. In some embodiments, problematic areas may be visualized on the preparation site, i.e., as parts of the digital 3D representation. For example, these areas may be shown as intersections or projections of the drill geometry along a simulated milling path, or as distances between drill surface and preparation surface along that path position. When drill compensation occurs, such a distance may be larger than the cement gap.

In some embodiments, problem areas may be problematic volumes visualizable by volumetric rendering. Problematic volumes may be three-dimensional spaces in or on the preparation that would be occupied by the drill during milling, where the drill touches the inner surface of the crown only due to the need for drill compensation. In particular, a problematic volume that should be drilled away for the preparation to no longer be problematic could be highlighted. A problematic area may also be rendered as a surface of a problematic volume. Volumetric rendering may include slicing or employ various degrees of transparency.

In some embodiments, the evaluation may conclude by indicating that there are no problem areas.

An embodiment further comprises generating a digital dental prosthesis in a single patient visit.

Generating a digital dental prosthesis in a single patient visit by the method discussed above saves time and money for both dental practitioner and patient. Where creating the digital dental prosthesis requires only a few iterations, an initial model of a digital dental prosthesis may be generated that day.

A method according to any one or more of the preceding items further comprises:
 calculating an effect of at least one drill characteristic; and
 adjusting the attainable thickness and/or the inner surface based on the effect of the at least one drill characteristic.

An embodiment further comprises considering the effect of at least one drill characteristic in evaluating the preparation surface and/or generating the digital dental prosthesis. A drill characteristic may be, for example, drill radius, drill material, drill shape, drill cost, drill durability, drill direction, etc. An example of an effect of a drill characteristic is drill compensation, a measure taken to compensate for the radius of the drill. Drill compensation implies the need to drill more of the inside of the prosthesis in the manufacturing than would be required to just match the surface of the prosthesis site offset by the cement space. Drill compensation may be required when a prosthesis site's corner radius at least in some area is smaller than the drill radius of the milling machine to be used for manufacturing.

The size of the drill head may impose limitations on the geometries that can be milled. Since a good fit is required, this may be of particular importance on the inner surface of the prosthesis, where the prosthesis is directly adjacent to the prosthesis site. In typical digital design software such as 3Shape DentalSystem, a drill compensated inner surface of the prosthesis may be calculated based on the prosthesis site.

A drill radius may indicate, for example, the radius of a fully spherical drill tip, or the edge radius of a drill tip that is round near the edge but flat at the center. The disclosure also applies to other shapes of drills analogously. While a milling machine often has a set of drills, mathematically, the limiting one with respect to achieving some small corner radius on the inner surface of a prosthesis is the smallest radius of all drills of the set.

An effect of drill compensation may be the removal of prothesis material that could otherwise contribute to fulfilling minimum thickness requirements. As the problem of preparation edge radius being smaller than milling machine drill radius is common, the need for drill compensation may also be common. It is therefore often insufficient to measure just the distance from a prosthesis site to the opposing dentition when ascertaining a potential prosthesis's ability to fulfill minimum thickness requirements. For more information on computing a drill-compensated inner surface of dental prostheses, see, e.g., EP 3,197,389 filed 2015 Sep. 24; US20170273763A1 filed 2015 Sep. 24.

A method according to any one or more of the preceding items, further comprising:
 calculating an effect of a plurality of drill radii on the at least one attainable thickness and/or the inner surface; and
 selecting at least one drill radius based on the calculation of the effects of the plurality of drill radii.

In some embodiments, drills of different radii may be used to manufacture a dental prosthesis, and this may affect the attainable thickness, which in turn, affects the digital dental prosthesis. For example, a smaller drill radius may be able to manufacture a dental prosthesis that meets a minimum thickness, while a larger may not. On the other hand, the dental prosthesis may not require a smaller drill bit that is more expensive per use. By calculating the impact of a plurality of drill radii, the dental practitioner may be enabled to choose a more accurate or more cost-effective solution.

An embodiment further comprises selecting a drill by:
 estimating a cost of drill wear from manufacturing a dental prosthesis based on the digital dental prosthesis for each of a plurality of drills; and
 selecting the drill based on the estimated costs of drill wear.

In some embodiments, drills may be selected based on a cost evaluation. Drills with small radii such as 0.3 mm may be used for manufacture; however, such drills are fragile and thus expensive per use. Also, milling with small-radius drills takes more time. Thus, an evaluation of digital dental prostheses may consider which ones are cheaper and/or faster to manufacture, as well as adjustments that can be made to reduce the cost and/or time.

An evaluation according to this disclosure may also consider various drill radii including a combination thereof. Such an evaluation may also include an evaluation of the cost. For example, a larger drill may be used for a rough cut with a smaller drill used to render the finer details, and the cost calculated by expected hours of use for each drill bit multiplied by the expected cost per hour. The results thereof may be presented to the dental practitioner. A minor change to the prosthesis site may allow significant savings in manufacturing cost by obviating the need to use a drill with a small radius.

An embodiment further comprises selecting a drill direction based on the at least one attainable thickness, the digital dental prosthesis, and/or the digital oral situation.

In an embodiment of this disclosure, a drill direction may be identified. The drill direction is the direction from which the milling drill approaches the inner surface of the prothesis during manufacture. For example, the drill direction may be the opposite of the insertion direction, as described below.

Different drill directions may be considered for different parts of the inner surface and, as a generalization thereof, a continuum of drill directions may be considered. Scenarios with multiple drill directions may occur if a 5-axis milling machine is to be used for manufacture of the dental prosthesis or if a non-linear path of insertion is considered. In one embodiment of the disclosure a single drill direction is used in calculating the drill compensated inner surface. If a 3-axis milling machine is to be used for the manufacture of the prosthesis, the drill direction may be the opposite of the insertion direction. Said insertion direction may specify the direction along which the crown is to slide onto the preparation when it is mounted. The insertion direction may be selected such that the undercuts on the preparation are reduced and/or minimized A detailed example of selecting the drill direction is described below.

An embodiment further comprises:
  detecting at least one undercut area in the preparation surface; and
  adjusting the attainable thickness, the inner surface, and/or the preparation surface based on the undercut area.

An embodiment further comprises detecting the location and severity of undercut areas on the preparation surface, and making adjustments to mitigate the results of undercut areas. To reduce the harm of an undercut area, the attainable thickness, the inner surface, the preparation surface may be adjusted, and/or a combination of the above may be adjusted.

An undercut is the portion the preparation surface that is not visible when viewing the preparation surface as an orthographic projection along the insertion direction. Thus any selection of an insertion direction defines the undercut areas on the preparation surface. Selection of the insertion direction is discussed further below. One approach to evaluating if a point on the preparation surface is undercut uses ray tracing: A ray is emitted from the point on the preparation surface in the direction opposite to the insertion direction. If the ray intersects with the preparation surface at any other point than the point under evaluation, said point is undercut.

Once undercut areas are detected, multiple embodiments may exist to deal with them. The first is to adjust the dental prosthesis and/or digital dental prosthesis so that it may be inserted. This may be done, for example, by adjusting the inner surface of the dental prosthesis, for example, by removing the undercut by simply milling away the part that would block insertion. This is a quick and efficient way to do it, and may be useful in situations where the change is minor and the gap can be filled in with cement.

However, where the gap would be larger, the dental prosthesis may be at risk of harboring bacteria and damaging the underlying tooth. This is especially true at the margin line, where a good seal is important. Large undercuts may also mean that the dental prosthesis fail to meet minimum thickness requirements. One way to deal with this second problem is to adjust the outer surface to compensate, perhaps by moving it in a direction normal to the surface by the necessary amount.

In an embodiment, the preparation surface may be adjusted. Where there is an overhang large enough to create a problem, the preparation surface may be ground down such that the undercut area could be acceptably patched with cement or by other methods. The dental practitioner may use an intraoral scanner on the preparation surface to detect any such overhangs, then scan again to determine if the overhang was sufficiently ground down.

In an embodiment, a combination of adjusting the digital dental prosthesis and adjusting the preparation surface may be used. This may be useful, where, for example, reducing an overhang on a preparation surface by a certain amount would allow the digital dental prosthesis to be adjusted such that the cement gap was acceptable.

A method according to any of the preceding claims, further comprising determining at least one undercut area based on a selected insertion direction.

A method according to any of the preceding claims, further comprising:
  evaluating a plurality of insertion directions for undercut areas; and
  selecting an insertion direction from the plurality of insertion directions based on determined undercuts.

Selecting an insertion direction for a prosthesis such that there are no undercuts close to the margin line may allow for a closer fit; a close fit in this area may be necessary to ensure that the inside of the prosthesis is sealed off. One simple approach is to select the insertion direction based on dot products between the negative of the insertion direction with the facet normal of each facet: The insertion direction is selected such that it maximizes the area-normalized sum of these dot products. A possible implementation of this approach is obtained by evaluating the area-normalized sum for each of a plurality of randomly selected candidate insertion directions and selecting the one yielding the largest value. Another embodiment is to select the insertion direction such that the undercut area along a band along the margin line is reduced, and, if a direction exists such that there are no undercuts in this band, to select it such that the total undercut area is reduced with the constraint that said band along the margin line has no undercuts.

A method according to any one or more of the preceding items further comprising: obtaining a coating distance for an external coating;
  adjusting the inner surface, the outer surface, and/or the preparation surface based on the coating distance.

An embodiment further comprises adjusting the inner surface, the outer surface, and/or the preparation surface for an expected coating. Coating materials may be used in manufacturing dental prostheses to improve appearance of function, for example, a porcelain coating on a cubic zirconia crown. However, coating the dental prosthesis in such a material adds thickness to the prosthesis. One way to compensate for this is to adjust the inner surface, outer surface, and/or preparation surface of the digital dental prosthesis to account for this coating.

In an embodiment, an expected thickness for a coating may be obtained, and used to calculate a coating distance by which the surface should be moved. For the digital dental prosthesis, points on the outer surface and/or the inner surface may then be moved by the suitable distance in a direction opposite to the normal of the surface. Essentially, the digital dental prosthesis has its surfaces moved inward and its overall volume shrunk to accommodate for an expected coating. This allows the dental prosthesis to be manufactured to still fit the oral situation, despite the addition of the coating.

The adjusted digital dental prosthesis may also be re-evaluated for minimum and attainable thicknesses.

Further, alone or in combination with adjustments to the inner surface and/or the outer surface, the preparation surface may also be adjusted to accommodate an expected coating, e.g. ground down a bit further.

An embodiment further comprises adjusting the digital dental prosthesis by:
- generating at least one parameter for the outer surface; and
- adjusting the outer surface based on the at least one parameter.

In an embodiment, the outer surface may be further adjusted, for example, for aesthetic and/or functional reasons. It may be useful to have it adjusted by a parameter, a defining quality of the shape of the outer surface. Parameters include characteristics like height and width, for example, making a crown taller to ensure that the crown meets the opposing tooth for proper occlusion. It may also include characteristics such as buccal bulginess or cusp height. An embodiment uses principal components from a principal component analysis of many outer surfaces as parameters, allowing the outer surface to be manipulated by these. The digital dental prosthesis may be re-evaluated for the at least one minimum thickness and the at least one attainable thickness as described above.

An embodiment further comprises permitting a user to sculpt the outer surface with the sculpting application.

At times, a dental practitioner may wish to use their own judgment in altering the outer surface of a digital dental prosthesis. In this case, the outer surface may be processed into a format usable by a sculpting application, such as a mesh or a point net, if it is not already in such a format. A sculpting application may then allow the user to sculpt the surface. Sculpting applications include, for example, programs like Blender, Zbrush, or tools from programs such as the sculpting tool in 3Shape's Dental Desktop.

An embodiment further comprises adjusting the inner surface by:
- obtaining a cement gap distance for a cement gap;
- adjusting the attainable thickness, the digital dental prosthesis, and/or the preparation surface based on the cement gap distance.

An evaluation of attainable thickness may consider a cement gap between preparation and the inner surface of the prothesis. Dental cement is used to bind the prosthesis to the preparation surface. A typical value for a gap to hold cement may be, for example, in the range of 30 µm to 90 µm.

In an embodiment, the attainable thickness may be, for example, reduced by the cement gap distance for the cement gap, and the evaluation of the preparation surface adjusted accordingly.

In an embodiment, the inner surface and/or outer surface of the digital dental prosthesis may be offset by a cement gap distance in a direction normal to the inner surface and away from the prosthesis site.

In an embodiment, the preparation surface itself may be adjusted to accommodate the cement gap distance for the cement gap.

The above embodiments may be used alone or in combination.

An embodiment further comprises selecting at least one prosthesis material by:
- evaluating the at least one minimum thickness based on each of a plurality of prosthesis materials; and
- selecting at least one of the plurality of prosthesis materials based on the evaluation of the at least one minimum thickness.

An embodiment selects a prosthesis material by evaluating a plurality of prosthesis materials to see which one is a better fit for the situation. Potential prosthesis materials comprise:
- metal alloys, ceramic-based materials such as lithium disilicate and zirconia, resins, porcelains, and/or combinations of the above.

As discussed above, minimum thickness can vary depending on where the material is to be used. Depending on the patient's individual oral situation, different materials might suit. For example, a lithium disilicate posterior crown requires a minimum thickness of 1.5 mm at cusps at the occlusal surface and buccal and lingual areas as well; however, zirconium oxide requires 1.5 mm at the cusps of the occlusal surface, and only 1.2 mm at the buccal and lingual areas. Thus, for an oral situation with neighboring teeth closer to the prosthesis site, it may make more sense to use zirconium oxide. On the other hand, a patient might prefer the aesthetics of lithium disilicate. In evaluating a digital dental prosthesis for meeting the minimum thicknesses of different materials allows for viable materials to be chosen, or for the dental practitioner to further modify the digital dental prosthesis to meet the minimum thickness requirements for a desired material.

An embodiment further comprises selecting the at least one prosthesis material by:
- estimating a cost of each of a plurality of prosthesis materials; and
- selecting at least one of the plurality of prosthesis materials based on the estimated costs.

Dental prosthesis materials may differ significantly in price. Thus, it may be useful to compare the cost to allow the dental practitioner and/or patient to decide on which crown material to use. The software, may, for example, automatically select the lowest cost material viable.

A method according to any one or more of the preceding claims, wherein the oral situation further comprises at least one opposing tooth, the method further comprising:
- identifying at least one opposing tooth surface in the digital oral situation;
- identifying a desired interocclusal distance; and
- adjusting the attainable thickness and/or outer surface based on the desired interocclusal distance and the at least one opposing tooth surface.

An interocclusal distance is a vertical distance between the occluding surfaces of the upper and lower teeth when the mandible is in the resting position; a tooth in this context may comprise a tooth with a dental prosthesis. If the prosthesis design leaves a little space to the opposing teeth, the natural reaction of the body is to move the prosthesis towards the opposing tooth until resistance is met in occlusion. On the other hand, if the prosthesis design is such that it already connects with the opposing teeth when in occlusion the body cannot naturally adjust the interocclusal distance. Such geometries may cause excessive stress on the prosthesis material. For this reason, it is better to allow for a small interocclusal distance in the prosthesis design.

Here, at least one opposing tooth surface to the preparation surface is found in the digital oral situation, for example, by manual annotation or segmentation by machine learning algorithm as discussed above.

A desired interocclusal distance is identified. This may be based, for example, on patient characteristics, technical requirements, and/or clinical requirements. An older patient, for example, may have less expected tooth growth than a younger one. A dentate patient, on average, greater occlusal spaces than a partially edentulous one. (See Montero & Dib, 2019, Abstract). The interocclusal space may be, for example, as small as zero where the opposing teeth touch, and as large a 10 mm. An average interocclusal space for a dentate patient may be between 2 and 4 mm, but may further vary depending on where it is located on the tooth.

In an embodiment, the attainable thickness may be adjusted based on the desired interocclusal distance. For a given on the preparation surface, the attainable thickness may be reduced by a value based on the desired interocclusal distance desired for the point. This may be, for example, the desired interocclusal distance itself, the desired interocclusal distance adjusted for the angle of the attainable thickness, and/or the desired interocclusal distance adjusted by an expected deviation.

In an embodiment, the digital dental prosthesis may be adjusted by the desired interocclusal distance. For example, for a point on the outer surface, the nearest point on the opposing surface may be found, and if the distance between the two does not comply with the desired interocclusal distance, the point on the outer surface may be moved to accommodate the desired interocclusal distance. As discussed above, the desired interocclusal distance may be adjusted based on the situation.

A method according to any one or more of the preceding claims, wherein the oral situation further comprises at least one neighboring tooth, the method further comprising:
 identifying at least one neighboring tooth surface;
 identifying a desired interproximal distance; and
 adjusting the attainable thickness and/or outer surface based on the desired interproximal distance and the at least one neighbouring tooth surface.

An interproximal distance is the distance between neighboring teeth. When a tooth is ground down to create a preparation surface, the interproximal support it provides to its neighbouring teeth is removed. This may lead to a small rotational movement of the neighbouring teeth towards the centre of the prosthesis site. To correct this rotational movement, a dental prosthesis may be designed to slightly protrude into the neighbouring teeth surfaces at its closet points to the neighboring teeth. This ensures that a tight interproximal fit is achieved when the prosthesis is mounted. If such a protrusion into the neighbouring teeth is desired, it may be accomplished by adjusting the attainable thickness and/or outer surface based on a desired interproximal distance.

Here, at least one neighboring tooth surface to the preparation surface is found in the digital oral situation, for example, by manual annotation or segmentation by machine learning algorithm as discussed above.

A desired interproximal distance is identified. This may be based, for example, on patient characteristics, technical requirements, and/or clinical requirements. The interproximal distance may vary, depending on where on the tooth it is located, as well as the intention of the treatment, as described below.

In an embodiment, the attainable thickness may be adjusted based on the desired interproximal distance. For a given on the preparation surface, the attainable thickness may be reduced by a value based on the desired interproximal distance desired for the point. This may be, for example, the desired interproximal distance itself, the desired interproximal distance adjusted for expected rotation, and/or the desired interproximal distance adjusted by an expected deviation.

In an embodiment, the digital dental prosthesis may be adjusted by the desired interproximal distance. For example, for a point on the outer surface, the nearest point on the neighboring surface may be found, and if the distance between the two does not comply with the desired interproximal distance, the point on the outer surface may be moved to accommodate the desired interproximal distance. As discussed above, the desired interproximal distance may be adjusted based on the situation.

In an embodiment, the digital dental prosthesis may be designed to slightly protrude on to the neighboring teeth. Here, the outer surface may be adjusted by a small amount, e.g. 0.05 mm to 0.1 mm, at the points nearest to the neighboring tooth, in a direction normal and outwards from the outer surface. This allows the resulting dental prosthesis to protrude slightly into its neighbor. This may be accomplished for example, by geometrical calculations, e.g. moving certain points outward and smoothing, by manual corrections to the digital dental prosthesis in a sculpting application, and/or by a machine learning algorithm trained on data to make such movements, such as running a principle component analysis on tooth outer surfaces and adjusting a tooth by changing principle components.

A method according to any of the preceding items, where the prosthesis comprises: a crown, bridge, a veneer, an inlay and/or onlay.

Various dental prostheses may benefit from the method described, including but not limited to: crowns, inlays, onlays, bridges, and/or veneers. Using the computer-implemented method described to evaluate digital oral situation and the digital dental prosthesis may be useful in creating these.

A computer program product in a non-transitory medium configured, when run, to execute the method of one or more of the preceding items.

The disclosure further comprises a computer program product, for example, software or hardware with embedded programming, that carries out the methods described in the disclosure.

A method of preparing a preparation surface with digital assistance during an appointment, comprising:
 preparing a preparation surface in an oral situation;
 generating a first digital oral situation by intraorally scanning the oral situation;
 evaluating the first digital oral situation; and
 returning a result.

In a second aspect of the disclosure, a preparation surface may be made with digital assistance. As discussed above, one reason for less than optimal preparation surfaces is the inconvenience of scheduling a second appointment to fix a preparation surface. By using an intraoral scanner and evaluating the preparation surface as described above, the preparation surface may be evaluated, and if needed, be corrected in a single appointment with a patient.

A dental technician may prepare a preparation surface in a patient's oral situation, for example, by removing dental tissue to make room for the dental prosthesis, etching, abrading, and/or other methods of tooth preparation. The disclosure allows the dental technician may be conservative with tissue removal, since the preparation site will be evaluated before a dental prosthesis is designed and/or manufactured.

A traditional crown procedure relies on taking dental impressions and sending them to a lab, where a crown is generated based on the dental impressions. In such a procedure, it is impractical to iterate between preparation and evaluation. As an intraoral scanner and digital models are used in this disclosure, the unnecessary removal of tissue may be reduced, compared to the traditional crown procedure.

The patient's oral situation is then intraorally scanned, as discussed above, and a first digital oral situation generated. As the use of an intraoral scanner is fast (for example, a typical 3Shape Trios scan can be as fast as 22 seconds and typically takes less than 5 minutes), and the incremental cost of another scan is low, multiple scans may be taken in a single appointment.

The first digital oral situation then may be evaluated, for example, for various attributes suitable for a prosthesis, such as attainable thicknesses for a dental prosthesis, minimum height for the preparation surface itself, potential undercuts, etc. As discussed above, this allows for potential problem areas to be quickly evaluated, or for a fast evaluated of the preparation surface.

A result is then returned. This result may be, for example, a validation that the preparation surface is likely to be acceptable, or a rejection of the preparation surface as suitable. The results may be returned, for example, as a sound in response to the scan, haptic feedback from the scanner, and/or as a visual display as discussed below.

By using an intraoral scanner and the computer-implemented methods described above, the preparation surface may be created, evaluated, and adjusted within a single patient session. As the dental practitioner is provided with more information during the scanning, they may adjust the preparation surface within a few minutes rather than waiting for laboratory results.

The method of previous claim further comprising evaluating the first digital oral situation according to any one or more of the preceding claims.

The methods discussed above in the first aspect of the disclosure describe several useful ways of evaluating a preparation surface and/or an oral situation; these may be used as part of evaluating the digital oral situation in the second aspect of the disclosure as well.

The method of the second aspect wherein returning a result further comprises displaying the first digital oral situation according to any one or more of the preceding claims.

The second aspect may further comprise an embodiment where the results returned are based on the methods of display discussed in the first aspect. This information may be conveyed to the dental technician by a display, as discussed in the first aspect above. This allows the dental technician to make decisions on how to proceed, for example, by letting them know that the preparation surface will allow for a valid dental prosthesis, or that more work on the preparation surface is needed, as discussed above and below.

An embodiment of the second aspect further comprises:
detecting at least one problem area in the first digital oral situation; and
adjusting the preparation surface based on the at least one problem area.

An embodiment of the second aspect further comprises detecting a problem area and adjusting the preparation surface based on that problem area. The problem area may be detected through methods discussed above, and adjustments made to the preparation surface as discussed above.

Intraoral scanning allows the dental technician to adjust the preparation surface based on the first digital oral situation. Where the initial preparation site is lacking in some way, the dental technician can now make adjustments. For example, where an attainable thickness fails to meet a minimum thickness, the dentist may adjust the preparation surface such that the minimum thickness may be met. Alternately, as discussed above, the dental technician may decide to use another material with a smaller minimum thickness. The embodiment allows for the dental technician to make a decision based on these multiple sources of information; in a traditional crown procedure, these decisions would be made by the laboratory and adjustments would be limited to corrections in the prosthesis itself.

An embodiment of the second aspect further comprises:
generating a second digital oral situation by intraorally scanning an oral situation comprising an adjusted preparation surface;
evaluating the adjusted preparation surface for problem areas; and
further adjusting the preparation surface where there is at least one problem area.

In an embodiment of the second aspect, the procedure described above may also be iterated, by scanning an oral situation with an adjusted preparation surface, evaluating, and adjusting, as described above. As discussed above, since the scanning and evaluation take at most a few minutes, the preparation surface may be adjusted again relatively quickly. This adjusted surface may be scanned and evaluated again, either for further adjustment, or validation, as described below. This procedure may be iterated several times, for example, until the preparation site is found valid or the dental practitioner feels that the preparation site is acceptable.

An embodiment of the second aspect further comprises:
detecting that there are no problem areas in the first or the second digital oral situation; and returning a validation of the preparation surface.

An embodiment of the second aspect detects that there are no problem areas in the first or the second digital oral situation and returns a validation of the preparation surface, where validation is an evaluation finding no known problems. Where there are no problem areas detected by the methods described above, the validation may be almost immediately returned. This allows the dental practitioner to have the dental prosthesis manufactured with a degree of confidence that the manufactured prosthesis will fit the preparation surface.

A system for verifying a preparation surface, wherein the system comprises an intra oral scanner for scanning an oral situation and/or a portion thereof, comprising the preparation surface of a patient whereon on a prosthesis is intended to be placed, and a processor connected to the intraoral scanner for generating at least part of the digital oral situation during scanning, wherein the processor verifies the preparation surface during scanning and wherein a the processor executes a computer-implemented method for verifying the preparation surface during scanning, the computer-implemented method comprising the method according to any one of the preceding claims, and wherein the result of comparing the at least one minimum thickness and the at least one attainable thickness determines the verification of the preparation site; and a display connected to the processor for visualizing at least part of the digital oral situation during scanning according to any one or more of the preceding claims.

In a third aspect of the disclosure, a system for verifying a preparation surface comprises an intraoral scanner, a processor, and a display.

The system comprises an intraoral scanner, similar to that described above, is used to scan an oral situation or a portion thereof, similar to that described above in the first aspect.

This oral situation or portion comprises a preparation surface, intended for a prosthesis, similar to those described above in the first aspect.

The system further comprises a processor connected to the intraoral scanner. This may be, for example, a computer embedded into the scanner itself, a separate computer, a computer located on a cloud and accessible to the intraoral scanner, etc.

The processor may be used to verify the preparation surface during scanning, for example, by any one or more of the computer-implemented methods described above in the first and/or second aspects. The processor may further be used to verify the preparation surface based on comparing at least one minimum thickness and at least one attainable thickness, as discussed above.

The system further comprises a display, for example, a computer screen, as described above. The display is used for visualizing at least parts of the oral situation, and may use the visualization methods described above in the first aspect and/or second aspect of this disclosure.

A method according to any one or more of the preceding items, further comprising manufacturing a dental prosthesis based on the digital dental prosthesis.

A dental prosthesis may be manufactured using the methods and system described in the embodiments above. Methods of manufacture for dental prostheses comprise: milling and/or 3D printing

REFERENCES

Montero, Javier, and Abraham Dib. "The effect of age and prosthodontic status on the clinical and electromyographic assessment of the interocclusal rest space." The Journal of prosthetic dentistry 121.5 (2019): 791-796; Abstract.

Items
1. A computer-implemented method of evaluating a dental preparation surface comprising:
   obtaining a digital oral situation and/or a portion thereof, comprising a preparation surface;
   evaluating at least one attainable thickness based on the preparation surface and surroundings; and
   comparing the at least one attainable thickness to at least one minimum thickness.
2. A method of any one or more of the preceding items, further comprising generating an inner surface for a digital dental prosthesis based on the preparation surface.
3. A method of any one or more of the preceding items, further comprising generating an outer surface for the digital dental prosthesis.
4. A method of any one or more of the preceding items, further comprising:
   defining a negative space around the preparation surface based on the digital oral situation; and
   generating an outer surface for the digital dental prosthesis based on the negative space.
5. A method of any one or more of the preceding items, further comprising generating the digital dental prosthesis based on the inner surface and the outer surface.
6. A method according to any one or more of the preceding items further comprising deriving the digital oral situation from an intraoral scanning device.
7. A method according to any one or more of the preceding items further comprising adjusting the digital dental prosthesis and/or the preparation surface by:
   evaluating the digital dental prosthesis and/or preparation surface for the at least one minimum thickness and the at least one attainable thickness;
   comparing the at least one minimum thickness and the at least one attainable thickness; and
   adjusting the digital dental prosthesis and/or preparation surface where the at least one minimum thickness and the at least one attainable thickness are in conflict.
8. A method according to any one or more of the preceding items further comprising displaying the digital preparation surface and/or digital dental prosthesis.
9. A method according to anyone of the preceding items, further comprising:
   evaluating the preparation surface for problems areas based on the at least one attainable thickness;
   displaying the digital preparation surface the digital oral situation, and/or the digital dental prosthesis; and
   highlighting the problem areas on the digital preparation surface the digital oral situation, and/or the digital dental prosthesis.
10. A method according to any one or more of the preceding claims, further comprising:
    aligning the digital dental prosthesis with the digital oral situation and/or the digital preparation surface; and
    displaying the digital dental prosthesis and the digital oral situation.
11. A method according to any one or more of the preceding items, further comprising:
    evaluating the aligned digital dental prosthesis and the digital oral situation for problem areas;
    displaying the aligned digital dental prosthesis and the digital oral situation; and highlighting the problem areas on the display.
12. A method according to any one or more of the preceding items, further comprising:
    evaluating the aligned digital dental prosthesis and the digital oral situation for problem areas;
    displaying the aligned digital dental prosthesis and the digital oral situation; and
    displaying the digital dental prosthesis and the digital oral situation.
13. A method according to any one or more of the preceding items, further comprising generating a digital dental prosthesis in a single patient visit.
14. A method according to any one or more of the preceding items further comprising:
    calculating an effect of at least one drill characteristic; and
    adjusting the attainable thickness and/or the inner surface based on the effect of the at least one drill characteristic.
15. A method according to any one or more of the preceding items, further comprising:
    calculating an effect of a plurality of drill radii on the at least one attainable thickness and/or the inner surface; and
    selecting at least one drill radius based on the calculation of the effects of the plurality of drill radii.
16. A method of any one or more of the preceding items further comprising selecting a drill by:
    estimating a cost of drill wear from manufacturing a dental prosthesis based on the digital dental prosthesis for each of a plurality of drills; and selecting the drill based on the estimated costs of drill wear.

17. A method of any one or more of the preceding items further comprising selecting a drill direction based on the at least one attainable thickness, the digital dental prosthesis, and/or the digital oral situation.

18. A method according to any one or more of the preceding items further comprising:
   detecting at least one undercut area of the preparation surface; and
   adjusting the attainable thickness, the inner surface, and/or the preparation surface based on the undercut area.

19. A method according to any one or more of the preceding items, further comprising determining at least one undercut area based on a selected insertion direction.

20. A method according to any of the preceding items, further comprising:
   evaluating a plurality of insertion directions for undercut areas; and
   selecting an insertion direction from the plurality of insertion directions based on determined undercuts.

21. A method according to any one or more of the preceding items, further comprising:
   obtaining a coating distance for an external coating; and
   adjusting the inner surface, the outer surface, and/or the preparation surface based on the coating distance.

22. A method according to any one or more of the preceding items, further comprising:
   generating at least one parameter for the digital dental prosthesis; and
   adjusting the digital dental prosthesis based on the at least one parameter.

23. A method according to any one or more of the preceding items, further comprising:
   processing the outer surface into a format usable for a sculpting application; and
   permitting a user to sculpt the outer surface with the sculpting application.

24. A method according to any one or more of the preceding items, further comprising:
   obtaining a cement gap distance for a cement gap;
   adjusting the attainable thickness, the digital dental prosthesis, and/or the preparation surface based on the cement gap distance.

25. A method according to any one or more of the preceding items further comprising selecting at least one prosthesis material by:
   evaluating the at least one minimum thickness based on each of a plurality of prosthesis materials; and
   selecting at least one of the plurality of prosthesis materials based on the evaluation of the at least one minimum thickness.

26. A method according to any one or more of the preceding items further comprising selecting at least one prosthesis material by:
   estimating a cost of each of a plurality of prosthesis materials; and
   selecting at least one of the plurality of materials based on the estimated costs.

27. A method according to any one or more of the preceding items, wherein the oral situation further comprises at least one opposing tooth, the method further comprising:
   Identifying at least one opposing tooth surface in the digital oral situation;
   Identifying an interocclusal distance; and
   Adjusting the attainable thickness and/or outer surface based on the interocclusal distance and the at least one opposing tooth surface.

28. A method according to any one or more of the preceding items, wherein the oral situation further comprises at least one neighboring tooth, the method further comprising:
   identifying at least one neighboring tooth surface;
   identifying a desired interproximal distance; and
   adjusting the attainable thickness and/or outer surface based on the desired interproximal distance and the at least one neighbouring tooth surface.

29. A method according to any of the preceding items, where the prosthesis comprises: a crown, bridge, a veneer, an inlay and/or onlay.

30. A computer program product in a non-transitory medium configured, when run, to execute the method of one or more of the preceding items.

31. A method of preparing a preparation surface with digital assistance during an appointment, comprising:
   preparing a preparation surface in an oral situation;
   generating a first digital oral situation by intraorally scanning the oral situation;
   evaluating the first digital oral situation; and
   returning a result.

32. The method of item 30 further comprising evaluating the first digital oral situation according to any one or more of items 1-7, 14, 18, 21, 24 and/or 27-30;

33. The method of items 30-31 wherein returning a result further comprises displaying the first digital oral situation according to any one or more of items 8-12.

34. The method of items 30-32 wherein evaluating the first digital oral situation further comprises:
   detecting at least one problem area in the first digital oral situation; and
   adjusting the preparation surface based on the at least one problem area.

35. A method of any of items 30-33 further comprising:
   generating a second digital oral situation by intraorally scanning an oral situation comprising an adjusted preparation surface;
   evaluating the adjusted preparation surface for problem areas; and
   further adjusting the preparation surface where there is at least one problem area.

36. The method of items 30-34 wherein evaluating the first and/or second digital oral situation further comprises:
   detecting that there are no problem areas in the first or the second digital oral situation; and
   returning a validation of the preparation surface.

37. A system for verifying a preparation surface, wherein the system comprises an intra oral scanner for scanning an oral situation and/or a portion thereof, comprising the preparation surface of a patient whereon on a prosthesis is intended to be placed, and a processor connected to the intraoral scanner for generating at least part of the digital oral situation during scanning, wherein the processor verifies the preparation surface during scanning and wherein a the processor executes a computer-implemented method for verifying the preparation surface during scanning, the computer-implemented method comprising the method according to any one of the preceding items, and wherein the result of comparing the at least one minimum thickness and the at least one attainable thickness determines the verification of the preparation site; and a display connected to the processor for visualizing at least part of the digital oral situation during scanning according to any one or more of the preceding items.

38. A method according to any one or more of the preceding items, further comprising manufacturing a dental prosthesis based on the digital dental prosthesis.

BRIEF DESCRIPTION OF THE DRAWINGS

The above and/or additional objects, features and advantages of the present disclosure, will be further described by the following illustrative and non-limiting detailed description of embodiments of the present disclosure, with reference to the appended drawing(s), wherein:

FIG. 7 shows a schematic of a system according to an embodiment of the disclosure.

DETAILED DESCRIPTION

In the following description, reference is made to the accompanying figures, which show by way of illustration how the disclosure may be practiced.

Figure 1:
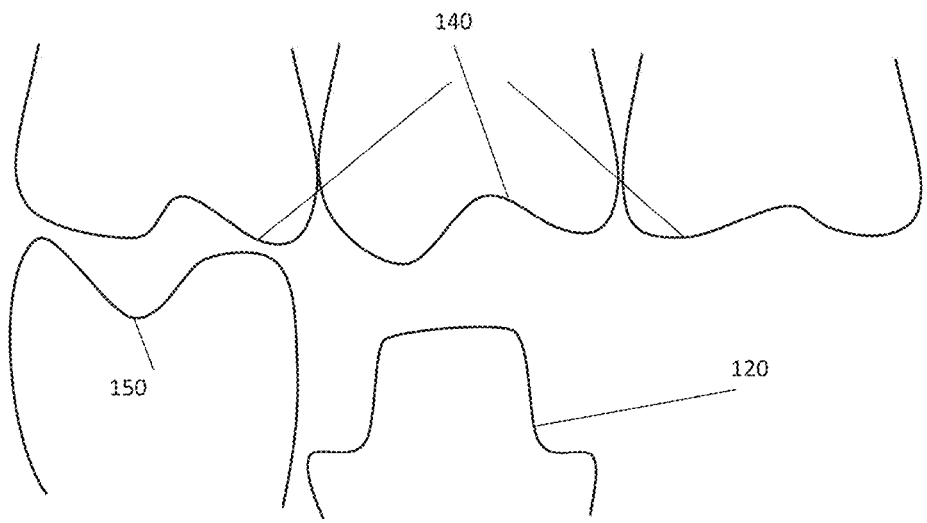
FIGS. 1(a) and 1(b) show an oral situation for which this disclosure is suitable.
Figure 1:
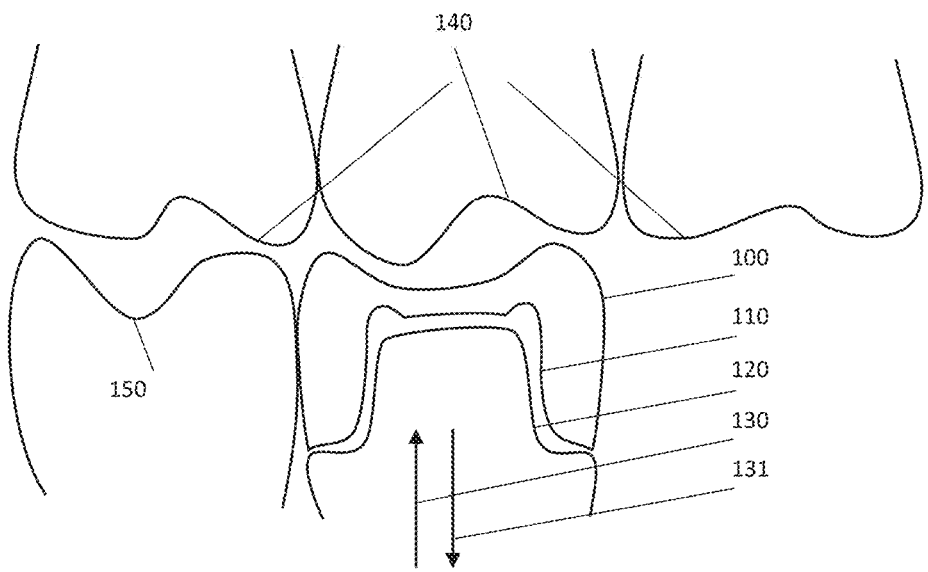

FIG. 1 shows an oral situation for which this disclosure is suitable. FIG. 1(a) shows a prosthesis site after a dentist has drilled away part of a tooth, leaving the preparation surface 120. FIG. 1(a) also shows the opposing teeth 140 and a neighboring tooth 150. There could be two neighboring teeth in other situations. When scanned, the intraoral situation is represented by a digital 3D representation. A 2D cross section thereof can look like FIG. 1(a), too.

FIG. 1(b) shows elements of an oral situation relevant for an evaluation of the digital 3D representation according to this disclosure. As a first step, at least part of the preparation surface 120 is identified. When evaluating space in the occlusal direction towards the opposing teeth 140, a detailed delineation of the boundary between the prepared and non-prepared area of the tooth, known as the margin line, is not required.

For the embodiment described here, it is assumed that a single crown prosthesis is to be manufactured using a 3-axis milling machine. For this case, a direction 130 from which the milling drill approaches the inside of the prothesis during manufacturing is also determined. In the example described here, the drill direction 130 may be selected as the opposite of the insertion direction 131. The insertion direction in this embodiment may be calculated as the direction for which the sum of the dot products of the direction and the normals of the facets of the mesh digital 3D representation that represent the preparation surface, weighted by facet area, is at a minimum.

Also shown in FIG. 1(b) is a crown prosthesis that is suitable for the oral situation, with inner surface 110 and outer surface 100.

Figure 2:
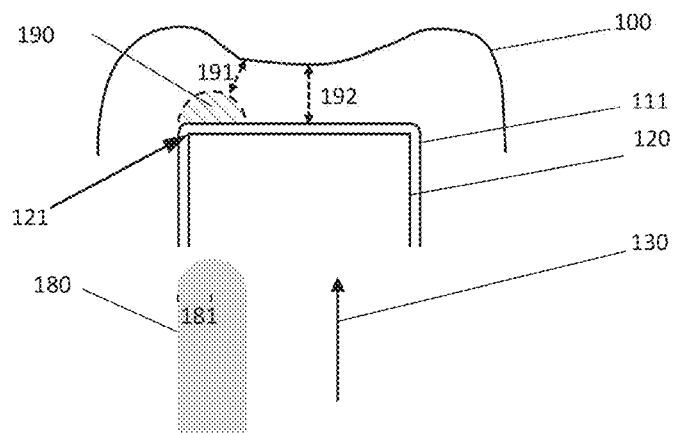
FIGS. 2(a) and 2(b) show preparation surfaces with prostheses.
Figure 2:
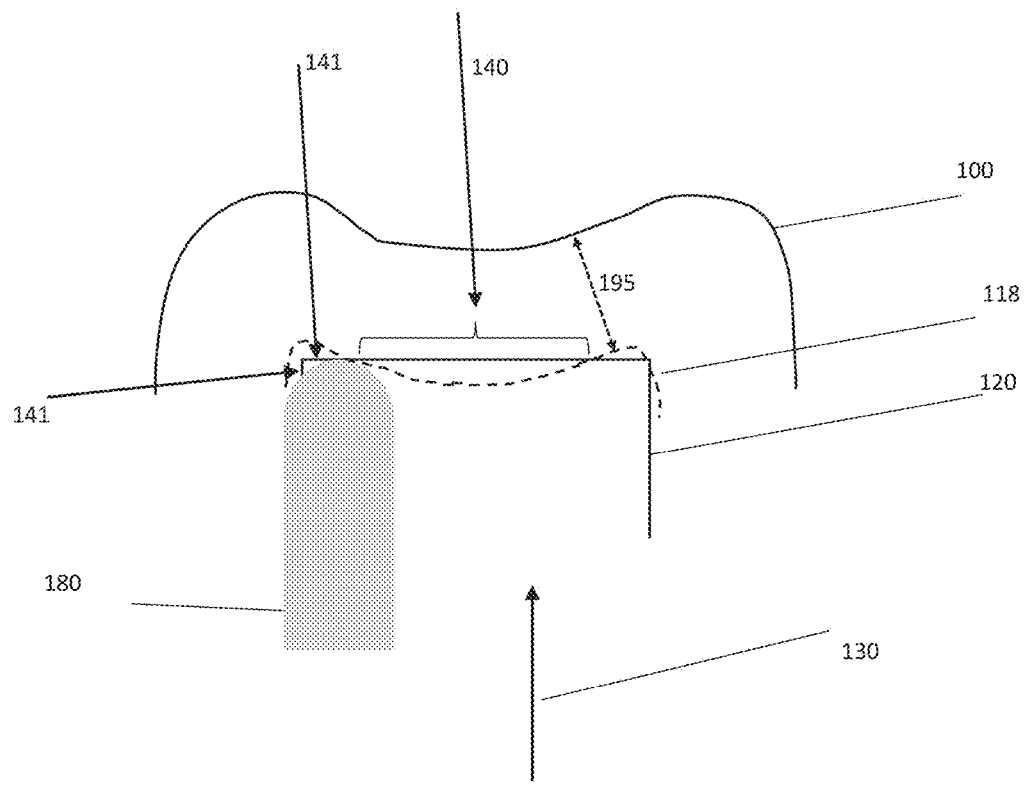

FIG. 2 shows preparation surfaces with prostheses.

FIG. 2(a) shows a preparation surface with a prosthesis, and illustrates the effects of drill compensation when evaluating the thickness of a digital dental prosthesis. For illustrative purposes, a preparation surface 120 with zero corner radius at edge 121 is shown, where the edge shows as a 2D point in the 2D FIG. 2(a). The ideal inner surface 111 may be described as an ideal inner surface of the crown to be manufactured; the ideal inner surface 111 may be offset from the preparation surface 120 outwards by the cement gap. Note that also for illustrative purposes, the cement gap in FIG. 2(a) is large relative to the drill radius. A simple evaluation of crown thickness may arrive at distance 192 as the value of attainable thickness at the location where it is smallest.

Also shown in FIG. 2(a) is a drill 180. Its spherical tip has a non-zero radius 181. It can be seen that 130 may be a suitable drill direction, because the drill then can access all parts of the ideal inner surface 111. The drill may not be part of a typical oral situation, as milling is performed in a machine outside the mouth, but the figure contains the drill for illustrating geometrical relationships to parts of the oral cavity. The crown material may be, for example, milled from a block such as a zirconia blank, i.e., the crown may be a sub-volume of that block.

If drill 180 is to remove all material from the inside of the block up to the ideal inner surface 111 of the crown to be milled, its head must move beyond the ideal surface 111 along direction 130. This means the drill may remove additional material 190 from the block. Accordingly, the value of attainable thickness of the milled crown at the location where it is smallest is distance 191, which is a smaller value than distance 192.

FIG. 2(b) illustrates a representation of a digital dental prosthesis, here, a potential crown design for a given preparation. The figure shows how problems arising from a drill radius larger than the corner radius of a preparation surface can be detected in an evaluation and visualized on the preparation surface. For a given material, the crown may have a required minimum material thickness 195. To fulfill that requirement, the crown's inner surface may need to be set inward from the outer surface 100 to at least surface 118. Software may highlight a problem area 140, where surface 118 crosses into preparation surface 120, i.e., where the minimum thickness requirement is not fulfilled. However, when also considering drill radius according to this disclosure, it becomes clear that area 141 may also be a problem area, on both faces of that corner of the preparation, even though the required surface 118 is not inside the preparation surface 120. It is thus appropriate to visualize both areas 140 and 141 as problem areas. The magnitude of the problem is the distance from surface 120 to the drill head 180 plus the requested thickness of the cement gap (for the sake of not further complicating the figure, no cement gap zone is shown in FIG. 2(b)). Said magnitude could be visualized using a color map.

If the crown of FIG. 2(b) were to be manufactured as is, drill compensation may be required, as in FIG. 2(a), and hence the crown may not attain the required minimum thickness. Thanks to the evaluation of this disclosure and the visualization thereof, the dental practitioner could however discover the problem and solve it before the crown is manufactured, by further grinding the preparation in area 141, for example, to have an edge radius equal to the drill radius. The patient may then receive a crown that has the required thickness and that can be seated.

Figure 3:
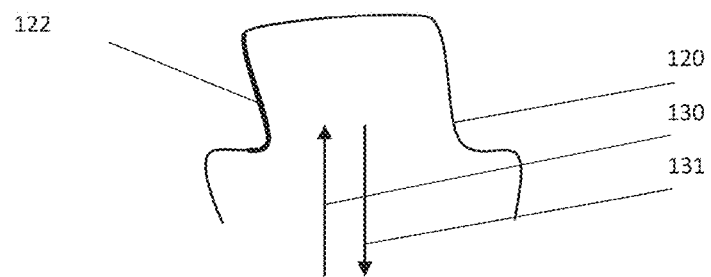
FIGS. 3(a) and 3(b) show a preparation surface with undercut and the calculation of an inner surface in this case.
Figure 3:
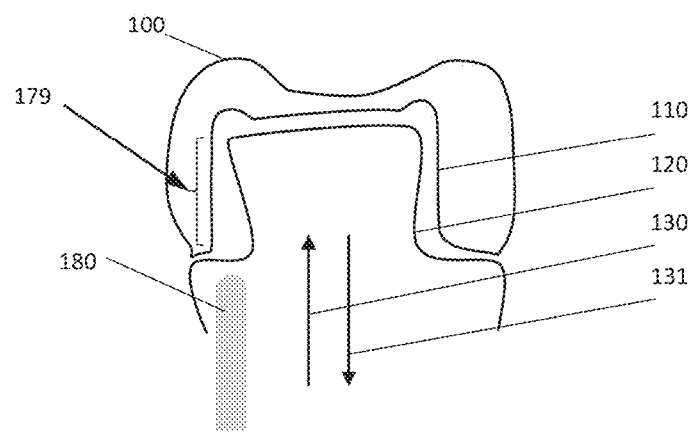

FIG. 3 shows a preparation surface with undercut and the calculation of an inner surface in this case.

FIG. 3(a) shows a preparation site 120 with a selected insertion direction 131 that gives rise to an undercut area 122. FIG. 3(b) illustrates the calculation of the inner surface 110 in this case. The undercuts may require additional crown material to be removed in the region 179 such that the crown can be seated. Also in this situation, the actual thickness of the crown differs by more than the cement gap value from the distance between prepared surface 120 and crown outer surface 100. Considering that the effects of undercuts may be important in the evaluation, a simple evaluation of crown thickness would give a false sense of safety.

Figure 4:
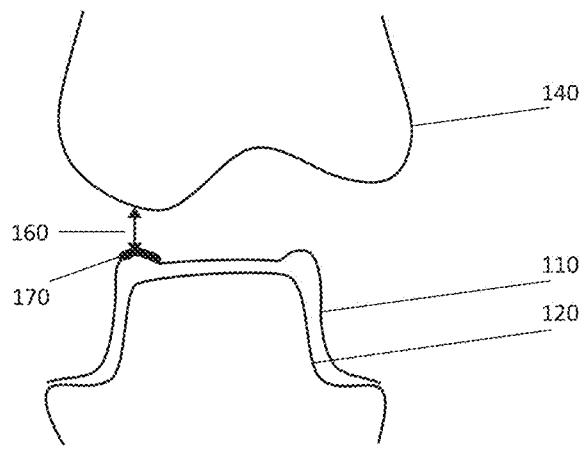
FIGS. 4(a) and 4(b) show some relevant distances relative to the surrounding dentition that can be evaluated and considered in the sense of this disclosure.
Figure 4:
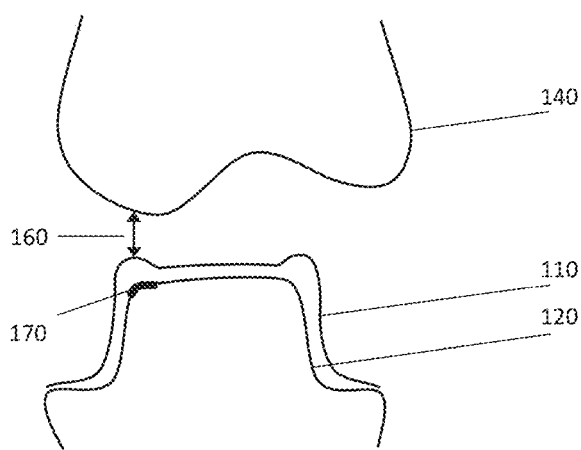

FIG. 4 shows some relevant distances relative to the surrounding dentition that can be evaluated and considered in the sense of this disclosure. Per FIG. 4(a), when the outer surface of the crown is to be designed, it should take opposing parts 140 parts of the patient's dentition into account. A minimum distance 160 of the distance from the inner surface 110 to the opposing parts 140 may be required to be equal to or greater than the sum of minimum thickness based on a material and any desired distance to the opposing surface. The minimum distance 160 may be calculated for the digital 3D representation and compared with the above requirement. The feasibility of a crown design may thus be established without a need to design the outer surface of a prothesis, which is hence not shown in FIG. 4. An analogous reasoning would apply for distances to neighboring teeth.

If the actual minimum distance 160 is smaller than the required value, the dental practitioner can be notified that the preparation has insufficient clearance to the opposing. Preferably, the minimum distance 160 is calculated as distance between the two closest points on the surfaces. It may also be approximated as the minimum distance between the two surfaces along the drill direction or insertion direction.

FIG. 4(a) also shows a problem area 170, visualized as a thick line in the 2D cross section, where distance between inner crown surface 110 and opposing dentition 140 may be less than required. The visualization in FIG. 4(a) shows where the drill may touch the inner crown surface 110. FIG. 4(b) shows an alternative visualization, where a problem area 170 is drawn as an intersection of the drill volume during drilling with the prepared surface 120 when the drill touches the inner surface. The variant in FIG. 4(a) may be more illustrative because it clearly shows the problem is due to drill compensation. The variant in FIG. 4(b) may be easier to understand because it only contains parts of the digital 3D representation obtained with the scanner. Note the black-and-white FIGS. 4(a) and (b) are very simple examples of visualization. If color were available, it could be used to visualize the magnitude of problems.

Figure 5:
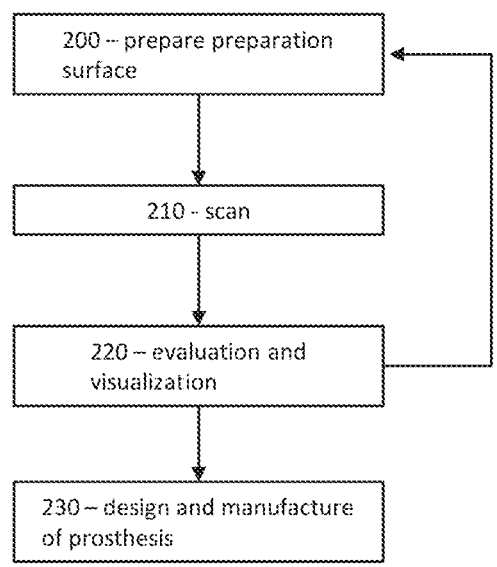
FIG. 5 illustrates a workflow in the sense of this disclosure.

FIG. 5 illustrates a workflow in the sense of this disclosure. A dental practitioner may prepare the preparation surface in step 200 and then proceed to scan the preparation surface and surroundings with an intraoral scanner in step 210. The preparation surface may then be evaluated and visualized in step 220. If the preparation has problem areas, the dental practitioner may be notified and return to step 200 to 220 to prepare the preparation surface further, then scan again. When a subsequent evaluation shows there are no more problem areas, the scan may be used for design and manufacturing of the prosthesis in step 230.

Figure 6:
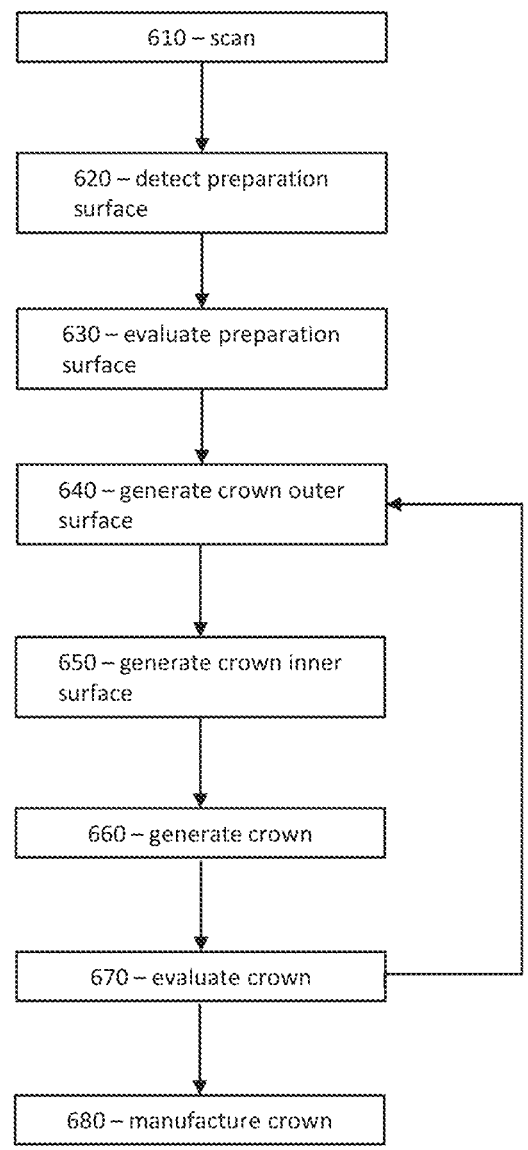
FIG. 6 shows an embodiment of a workflow for generating a digital dental prosthesis.

FIG. 6 shows an embodiment of a workflow for generating a digital dental prosthesis.

First, in step 610, a patient is scanned with an intraoral scanner. This generates a three-dimensional model of the patient's oral situation. This 3D digital model may be based, for example, on voxels, meshes, and/or a combination of the above.

Next, in step 620, a preparation surface is detected. This may be done by manual annotation of the dentist. It may also be done with the assistance of or entirely by software trained to do such annotation, for example, by detecting the edges between tooth and gingiva, segmenting the tooth scans, and detecting the preparation site.

Next, in step 630, the preparation surface is evaluated by calculating distances between the detected preparation surface and the surroundings. The distances may be used as basis for the at least one attainable thickness and/or a negative space. This gives a set of physical limits for the generated crown to fit in. A dentist may manually set deviances for other teeth, for example, shaving a bit off the neighbors to allow a particularly close fit. The preparation surface may also be evaluated by calculating distances from one part of the preparation surface to another part of the preparation surface, e.g. to make sure the preparation surface meets at least a minimum diameter.

In step 640, an initial crown outer surface is generated for the preparation surface based on the at least one attainable thickness and/or negative space. This may be, for example, selected from a library or designed by an automated algorithm, e.g. a neural network trained to generate crown outer surfaces. At this point, it may still extend beyond the margin line, but it should meet the constraints imposed by the negative space and the deviants.

This may be, for example, initially generated from a library crown, then adjusted by at least one parameter for the outer surface, as discussed above.

The results is a digital 3D model of the outer surface of the crown.

In step 650, an initial inner surface for the crown is generated. This is based on the scan of the prep site. It may be adjusted to allow for a cement gap, e.g. allowing an extra 1 mm all around the preparation surface. It may also be adjusted for undercuts, e.g. areas where the portion that is further down is under an overhang more than a portion further up, therefore making insertion of a crown difficult. The inner surface may be based on the preparation surface, but adjusted such that the undercut portions are straightened out for insertion.

In step 660, a crown is generated. Both the initial outer surface and the initial inner surface are positioned in the digital oral situation, assigned certain values in Euclidean space. This means that they can be connected where they interest, for example, for each point on a mesh model of the initial outer surface, finding the nearest point on the initial inner surface. If these points are lined up as a line, anything outside that line can be discarded, both on the initial inner surface and the initial outer surface, the model can be stitched together at these points to generate an digital dental prosthesis.

Alternately, the margin line may be detected through edge detection, and the line drawn there. Both outer and inner surface may be attached at the margin line. Once the digital dental prosthesis is generated by this process, it may be further processed to make it look better, i.e. have its mesh decimated and regularized and the stitching made more smooth.

This digital dental prosthesis may be inserted into the oral situation and displayed, allowing both dentist and patient to see how it will look. However, it may still need to be evaluated.

Step 670 is evaluating the crown. In evaluating the digital dental prosthesis, minimum thicknesses may be calculated based on material. The material may be selected by a user, or alternately, different materials may be evaluated for thickness and feasible options presented to the software user.

A method of manufacture may also be evaluated, again, by selection of the user, or by the software evaluating different options and suggesting the most feasible one, based on criteria such as cost, strength. Methods of manufacture include milling and printing.

If the method of manufacture chosen is milling, drill compensation should also be considered in evaluation.

Where some minimum thickness is not met—for example, between opposing teeth, either the surroundings or the preparation surface may be adjusted in the 3D digital model As a further step, the dentist may make adjustments to the digital dental prosthesis. This may be done, for example, by a sculpting application, or by software trained to perform such an adjustment.

The dentist may choose to evaluate the digital dental prosthesis again, or may choose to accept the digital dental prosthesis as is. It may need to be further evaluated before manufacture for manufacturing specifications. Again, this digital dental prosthesis may be rendered in the digital oral situation for the dentist and patient to see.

If the digital dental prosthesis is invalid in areas, due to conflicts between the negative space/attainable thickness and digital dental prosthesis, the dentist may also choose to change the digital oral situation.

This process may be iterated until an acceptable digital dental prosthesis is found, i.e. repeating steps 640 to 670. Once an acceptable digital dental prosthesis is generated, it may be manufactured in step 680.

FIG. 7 shows a schematic of a system according to an embodiment of the disclosure. The system 100 comprises a computer device 102 comprising a computer readable medium 104 and a processor 103. The system further comprises a display, here, visual display unit 107, an input unit such as a computer keyboard 105 and a computer mouse 106 for entering data and activating virtual buttons visualized on the visual display unit 107. The visual display unit 107 may for example be a computer screen.

The computer device 102 is capable of obtaining digital representations, for example, of at least a part of a patient's oral situation through image acquisition device 101b. The obtained digital representations can be stored in the computer readable medium 104 and provided to the processor 103.

The computer device 102 is further capable of receiving a digital 3D representation, for example, of the surfaces of the patient's set of teeth and gingiva from an 3D scanning device 101a, for example an intraoral scanner, such as the TRIOS intraoral scanner manufactured by 3shape TRIOS A/S, or capable of receiving scan data from such a 3D scanning device and forming a digital 3D representation of the patient's oral situation based on such scan data. The received or formed digital 3D representation can be stored in the computer readable medium 104 and provided to the microprocessor 103.

The system 100 is configured for allowing an operator to design a customized dental restoration using information obtained from the bone scan and/or the surface scan, with limits being set based on pre-determined design criteria. This can be realized for example by displaying the digital representation of the patient's jaw on the visual display unit 107, and the operator can then visualize his/her restoration design on the visual display unit, with respect to the surface of the patient's jaw.

The system comprises a unit 108 for transmitting the digital designs, e.g. digital dental prostheses, as an output data to a fabrication machine for generating a dental appliance, such as a customized dental restoration to e.g. a computer aided manufacturing (CAM) device 109 for manufacturing the customized dental restorations or to another computer system e.g. located at a milling or printing center where the customized dental restorations are manufactured. The unit for transmitting can be a wired or a wireless connection, and the transmission may be done for example using the internet or File Transfer Protocol (FTP).

The 3D scanning of the patient's oral situation using the 3D scanning device 101a, and/or image acquisition device 101b can be performed at a dentist while the manufacture of the customized dental restoration may be performed at a dental laboratory. In such cases, the digital oral situation acquired from the scanning device and/or the digital dental prosthesis can be provided via an internet connection between the dentist and the dental laboratory.

The system 100 as shown is an illustrative example. For example, the computer device 102 may comprise more than one processor 103 and/or more than one computer readable medium 104, the visual display unit 107 may be integrated in the computer device 102 or be separate from the computer device 102, etc.

Although some embodiments have been described and shown in detail, the disclosure is not restricted to them, but may also be embodied in other ways within the scope of the subject matter defined in the following claims. In particular, it is to be understood that other embodiments may be utilized and structural and functional modifications may be made without departing from the scope of the present disclosure.

In device claims enumerating several means, several of these means can be embodied by one and the same item of hardware. The mere fact that certain measures are recited in mutually different dependent claims or described in different embodiments does not indicate that a combination of these measures cannot be used to advantage.

A claim may refer to any of the preceding claims, and "any" is understood to mean "any one or more" of the preceding claims.

The term "obtaining" as used in this specification may refer to physically acquiring for example medical images using a medical imaging device, but it may also refer for example to loading into a computer an image or a digital representation previously acquired.

It should be emphasized that the term "comprises/comprising" when used in this specification is taken to specify the presence of stated features, integers, steps or components but does not preclude the presence or addition of one or more other features, integers, steps, components or groups thereof.

The features of the method described above and in the following may be implemented in software and carried out on a data processing system or other processing means caused by the execution of computer-executable instructions. The instructions may be program code means loaded in a memory, such as a RAM, from a storage medium or from another computer via a computer network. Alternatively, the described features may be implemented by hardwired circuitry instead of software or in combination with software.

The invention claimed is:

1. A computer-implemented method of evaluating a dental preparation surface comprising:
   obtaining a digital oral situation and/or a portion thereof, comprising a digital preparation surface;
   using software trained to detect the digital preparation surface by segmenting the digital oral situation to identify teeth appropriate for the digital preparation surface based on a shape of the teeth, wherein the digital preparation surface is configured to receive a digital dental prosthesis;
   evaluating at least one attainable thickness, wherein the attainable thickness is configured as a distance between the digital preparation surface and a surrounding, the surrounding comprising a part of the digital oral situation that is not part of the digital preparation surface; and
   comparing the at least one attainable thickness to at least one minimum thickness as required by a dental restoration.

2. The method according to claim 1, further comprising generating an inner surface for the digital dental prosthesis based on the digital preparation surface.

3. The method according to claim 1, further comprising generating an outer surface for the digital dental prosthesis.

4. The method according to claim 1, further comprising:
   generating an inner surface for the digital dental prosthesis based on the digital preparation surface;
   generating an outer surface for the digital dental prosthesis based on the digital preparation surface; and
   generating the digital dental prosthesis based on the inner surface and the outer surface.

5. The method according to claim 1, further comprising adjusting the digital dental prosthesis and/or the digital preparation surface by:
   evaluating the digital dental prosthesis and/or the preparation surface for the at least one minimum thickness and the at least one attainable thickness;
   comparing the at least one minimum thickness and the at least one attainable thickness; and
   adjusting the digital dental prosthesis and/or the digital preparation surface where at least one of the at least one minimum thickness and at least one of the at least one attainable thickness are in conflict.

6. The method according to claim 1, further comprising displaying the digital preparation surface, the digital oral situation, and/or the digital dental prosthesis.

7. The method according to claim 1, further comprising:
   evaluating the digital preparation surface for problems areas based on the at least one attainable thickness;
   displaying the digital preparation surface, the digital oral situation, and/or the digital dental prosthesis; and
   highlighting the problem areas on the digital preparation surface, the digital oral situation, and/or the digital dental prosthesis.

8. The method according to claim 1, further comprising:
   aligning the digital dental prosthesis with the digital oral situation and/or the digital preparation surface; and
   displaying the digital dental prosthesis and the digital oral situation.

9. The method according to claim 1, further comprising:
   calculating an effect of at least one drill characteristic and/or an inner surface of the digital dental prosthesis; and
   adjusting at least one of the at least one attainable thickness and/or the inner surface of the digital dental prosthesis based on the effect of the at least one drill characteristic.

10. The method according to claim 1, further comprising:
    calculating an effect of a plurality of drill radii on the at least one attainable thickness and/or an inner surface of the digital dental prosthesis; and
    selecting at least one drill radius based on the calculation of the effect of the plurality of drill radii.

11. The method according to claim 1, further comprising:
    detecting at least one undercut area of the digital preparation surface; and
    adjusting at least one of the at least one attainable thickness, an inner surface of the digital dental prosthesis, and/or the digital preparation surface based on the at least one undercut area.

12. The method according to claim 1, further comprising selecting at least one prosthesis material by:
    evaluating the at least one minimum thickness based on each of a plurality of prosthesis materials; and
    selecting at least one of the plurality of prosthesis materials based on evaluation of the at least one minimum thickness.

13. The method according to claim 1, further comprising selecting at least one prosthesis material by:
    estimating a cost of each of a plurality of prosthesis materials; and
    selecting at least one of the plurality of materials based on the estimated costs.

14. The method according to claim 1, wherein the digital oral situation further comprises at least one opposing tooth, the method further comprising:
    identifying at least one opposing tooth surface in the digital oral situation;
    identifying an interocclusal distance; and
    adjusting at least one of the at least one attainable thickness and/or an outer surface of the digital dental prosthesis based on the interocclusal distance and the at least one opposing tooth surface.

15. The method according to claim 1, wherein the oral situation further comprises at least one neighboring tooth, the method further comprising:
    identifying at least one neighboring tooth surface;
    identifying a desired interproximal distance; and
    adjusting at least one of the at least one attainable thickness and/or an outer surface of the digital dental prosthesis based on the desired interproximal distance and the at least one neighbouring tooth surface.

* * * * *